US010744628B2

(12) United States Patent
Ferqueron

(10) Patent No.: US 10,744,628 B2
(45) Date of Patent: Aug. 18, 2020

(54) DISPOSAL SNAP RING INSTALLATION TOOL

(71) Applicant: Moen Incorporated, North Olmsted, OH (US)

(72) Inventor: Russell Anthony Ferqueron, North Olmsted, OH (US)

(73) Assignee: FB Global Plumbing Group LLC, North Olmsted, OH (US)

( * ) Notice: Subject to any disclaimer, the term of this patent is extended or adjusted under 35 U.S.C. 154(b) by 94 days.

(21) Appl. No.: 16/148,557

(22) Filed: Oct. 1, 2018

(65) Prior Publication Data

US 2019/0160640 A1 May 30, 2019

Related U.S. Application Data

(60) Provisional application No. 62/592,903, filed on Nov. 30, 2017.

(51) Int. Cl.
*B23Q 3/00* (2006.01)
*B25B 27/20* (2006.01)

(52) U.S. Cl.
CPC .................................... *B25B 27/20* (2013.01)

(58) Field of Classification Search
CPC .. B25B 1/00; B25B 3/00; B25B 27/00; B25B 27/20; B23Q 3/00; B23Q 3/06
See application file for complete search history.

(56) References Cited

U.S. PATENT DOCUMENTS 3,288,380 A 11/1966 Clements et al.
3,510,070 A 5/1970 Stratman
3,684,199 A 8/1972 Bebinger
3,982,703 A 9/1976 Meyers
4,135,258 A 1/1979 Braga et al.
4,411,054 A 10/1983 Zeilenga
5,177,853 A 1/1993 Herook
5,318,230 A 6/1994 Ferguson et al.
5,584,110 A 12/1996 Mordoch
6,477,756 B2 11/2002 Newcomer
(Continued)

OTHER PUBLICATIONS

Author unknown, Moen Garbage Disposal Installation Guide, this Installation Guide is believed to have been publicly available as of Aug. 2016 (20 pages).
(Continued)

*Primary Examiner* — Lee D Wilson
(74) *Attorney, Agent, or Firm* — Calfee, Halter & Griswold LLP

(57) ABSTRACT

The present invention provides a disposal snap ring installation tool that enables a consumer to easily install a disposal snap ring. The disposal snap ring installation tool includes a body and a handle. The body includes a base and an arm. At least a portion of the handle extends angularly downwardly and outwardly relative to the outer wall of the base. The base is operable to be inserted into a circumferential gap in a disposal snap ring. The arm is operable to receive an end of the disposal snap ring such that one end of the disposal snap ring abuts one of the first end wall and the second end wall of the base. The base is operable to be removed from the circumferential gap in the disposal snap ring by pulling the handle radially outwardly in a plane of the disposal snap ring.

19 Claims, 11 Drawing Sheets

(56) References Cited

U.S. PATENT DOCUMENTS

| | | | |
|---|---|---|---|
| 6,615,474 B2 | 9/2003 | Ramirez | |
| 7,185,408 B1 | 3/2007 | Keith | |
| 7,458,141 B2 | 12/2008 | Goldburt et al. | |
| 8,060,999 B2 | 11/2011 | Fistor | |
| 8,214,934 B2 | 7/2012 | Sullivan | |
| 9,108,305 B2 | 8/2015 | Walton | |
| 9,493,935 B2 | 11/2016 | Walton | |
| 2017/0057057 A1* | 3/2017 | Wilson, Jr. | B25B 13/481 |
| 2019/0001235 A1* | 1/2019 | Kremmer | A63B 31/00 |
| 2019/0118354 A1* | 4/2019 | MacDonald | B25B 13/463 |
| 2019/0160640 A1* | 5/2019 | Ferqueron | B25B 27/20 |
| 2020/0030943 A1* | 1/2020 | Napper | B25H 3/06 |

OTHER PUBLICATIONS

Author unknown, Westinghouse High Torque Garbage Disposal Owner's Manual, this Owner's Manual is believed to have been publicly available at least as early as Jun. 26, 2018 (13 pages).

* cited by examiner

DISPOSAL SNAP RING INSTALLATION TOOL

CROSS-REFERENCE TO RELATED APPLICATION

This application claims the benefit of U.S. Provisional Application No. 62/592,903, filed Nov. 30, 2017, the entire disclosure of which is hereby incorporated by reference.

FIELD

The present invention relates generally to a disposal snap ring installation tool and, more particularly, to a disposal snap ring installation tool that enables a consumer to easily install a disposal snap ring.

BACKGROUND

Tools for installing disposal snap rings are known. These tools have various drawbacks. Consumers desire a tool that enables them to easily install a disposal snap ring.

SUMMARY

The present invention provides a disposal snap ring installation tool that enables a consumer to easily install a disposal snap ring.

In an exemplary embodiment, the disposal snap ring installation tool includes a body and a handle. The body includes a base and an arm. The base is generally arcuate shaped in a circumferential direction. The base includes an inner wall, an outer wall, a first end wall, and a second end wall. The arm is generally arcuate shaped in a circumferential direction. The arm extends circumferentially outwardly from one of the first end wall and the second end wall of the base. At least a portion of the handle extends angularly downwardly and outwardly relative to the outer wall of the base. The base is operable to be inserted into a circumferential gap in a disposal snap ring. The arm is operable to receive an end of the disposal snap ring such that one end of the disposal snap ring abuts one of the first end wall and the second end wall of the base. The base is operable to be removed from the circumferential gap in the disposal snap ring by pulling the handle radially outwardly in a plane of the disposal snap ring.

In an exemplary embodiment, the disposal snap ring installation tool includes a body and a handle. The body includes a base and two arms. The base is generally arcuate shaped in a circumferential direction. The base includes an inner wall, an outer wall, a first end wall, and a second end wall. Each arm is generally arcuate shaped in a circumferential direction. One arm extends circumferentially outwardly from each of the first end wall and the second end wall of the base. The handle includes a first portion and a second portion. The first portion extends radially outwardly from the outer wall of the base. The second portion extends angularly downwardly and outwardly from the first portion. The base is operable to be inserted into a circumferential gap in a disposal snap ring. Each arm is operable to receive an end of the disposal snap ring such that each end of the disposal snap ring abuts one of the first end wall and the second end wall of the base. The base is operable to be removed from the circumferential gap in the disposal snap ring by pulling the handle radially outwardly in a plane of the disposal snap ring.

In an exemplary embodiment, the disposal snap ring installation tool includes a body and a handle. The body includes a base, two arms, and a plurality of tabs. The base is generally arcuate shaped in a circumferential direction. The base includes an inner wall, an outer wall, a first end wall, and a second end wall. Each arm is generally arcuate shaped in a circumferential direction. One arm extends circumferentially outwardly from each of the first end wall and the second end wall of the base. Each tab is generally arcuated shaped in a radial direction. At least one tab extends radially inwardly from each arm. At least a portion of the handle extends angularly downwardly and outwardly relative to the outer wall of the base. The base is operable to be inserted into a circumferential gap in a disposal snap ring. Each arm is operable to receive an end of the disposal snap ring such that each end of the disposal snap ring abuts one of the first end wall and the second end wall of the base. The tabs are operable to retain the ends of the disposal snap ring in the arms of the body. The base is operable to be removed from the circumferential gap in the disposal snap ring by pulling the handle radially outwardly in a plane of the disposal snap ring.

BRIEF DESCRIPTION OF THE DRAWINGS

FIGS. 11*a*-11*f* are views illustrating installation of a disposal snap ring using the disposal snap ring installation tool of FIG. 1.

DETAILED DESCRIPTION

Figure 2:
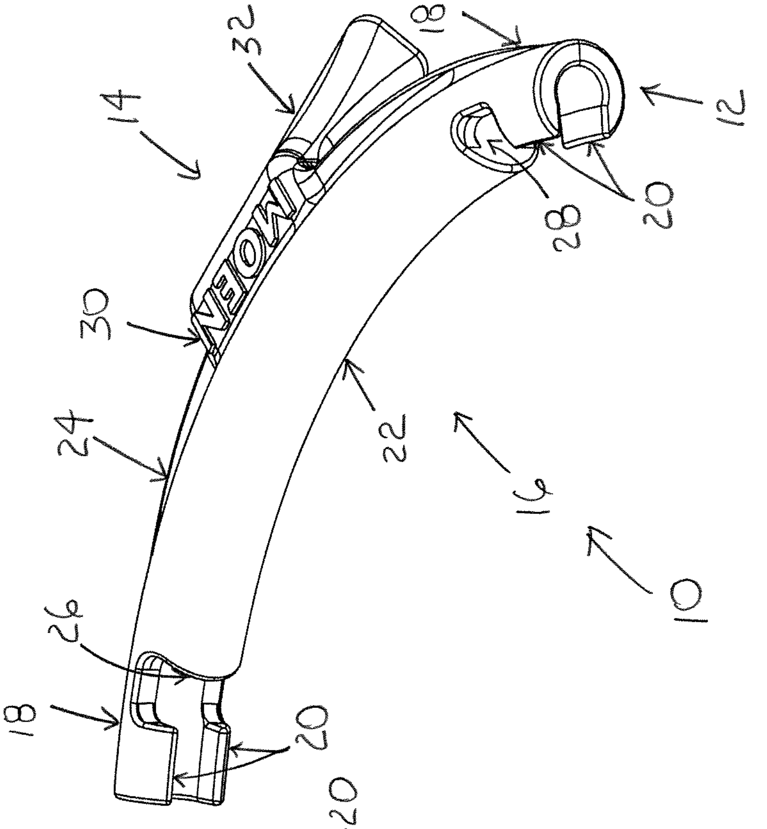
FIG. 2 is a front perspective view of the disposal snap ring installation tool of FIG. 1.
Figure 1:
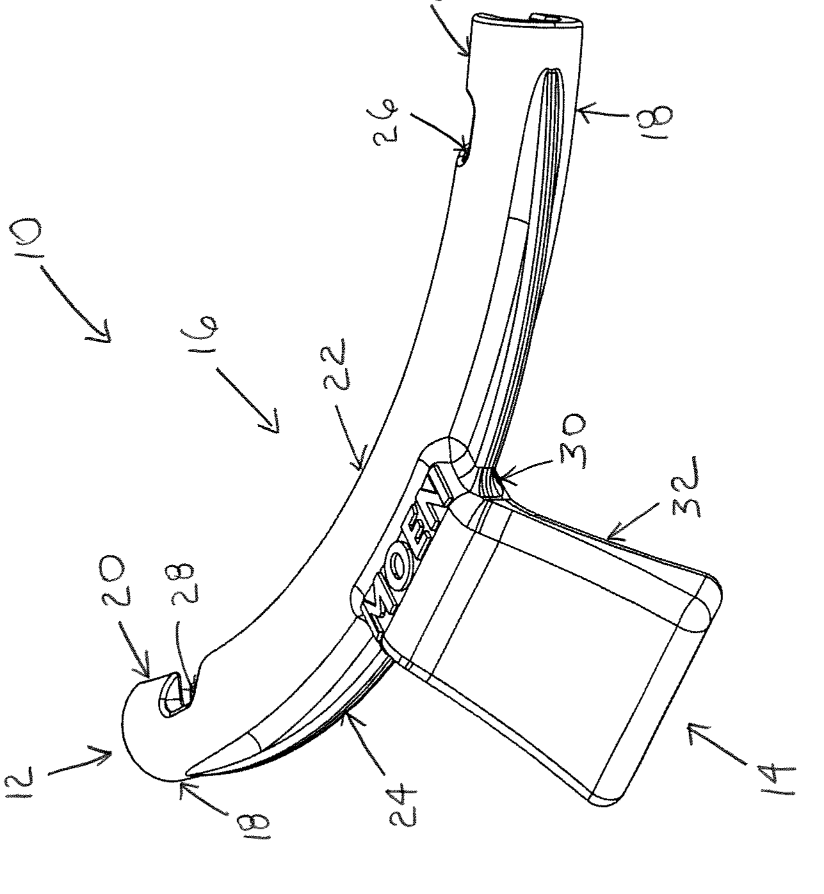
FIG. 1 is a rear perspective view of a disposal snap ring installation tool according to an exemplary embodiment of the present invention.
Figure 3:
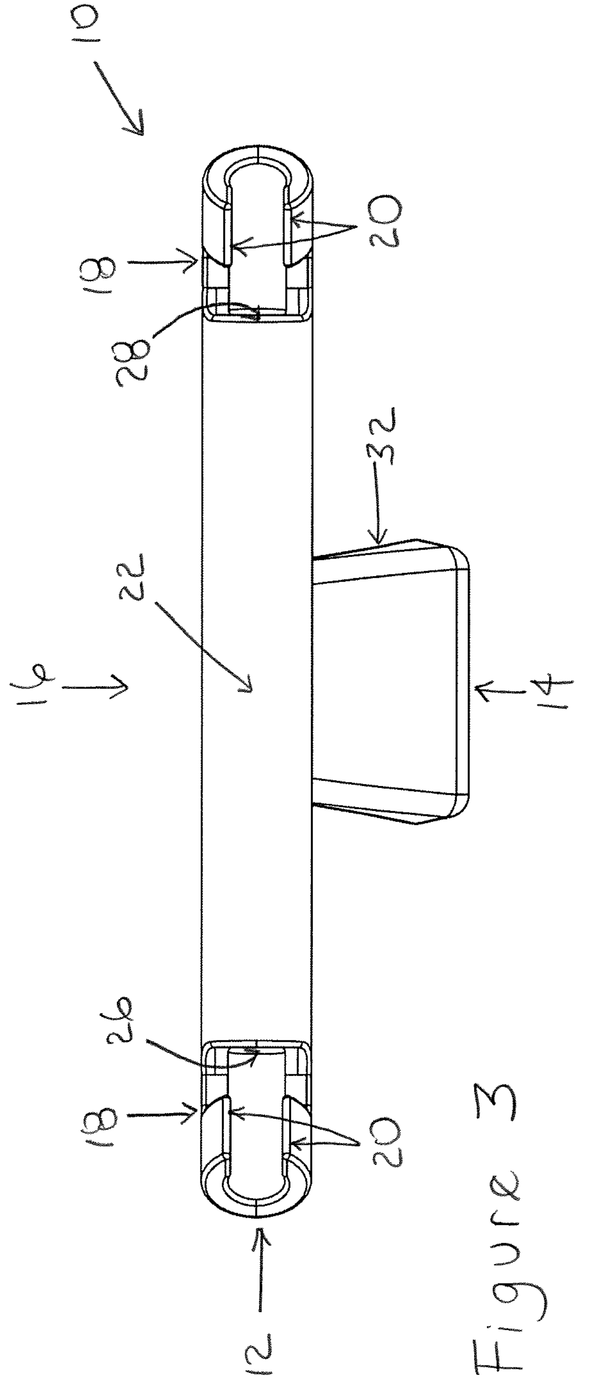
FIG. 3 is a front elevational view of the disposal snap ring installation tool of FIG. 1.
Figure 4:
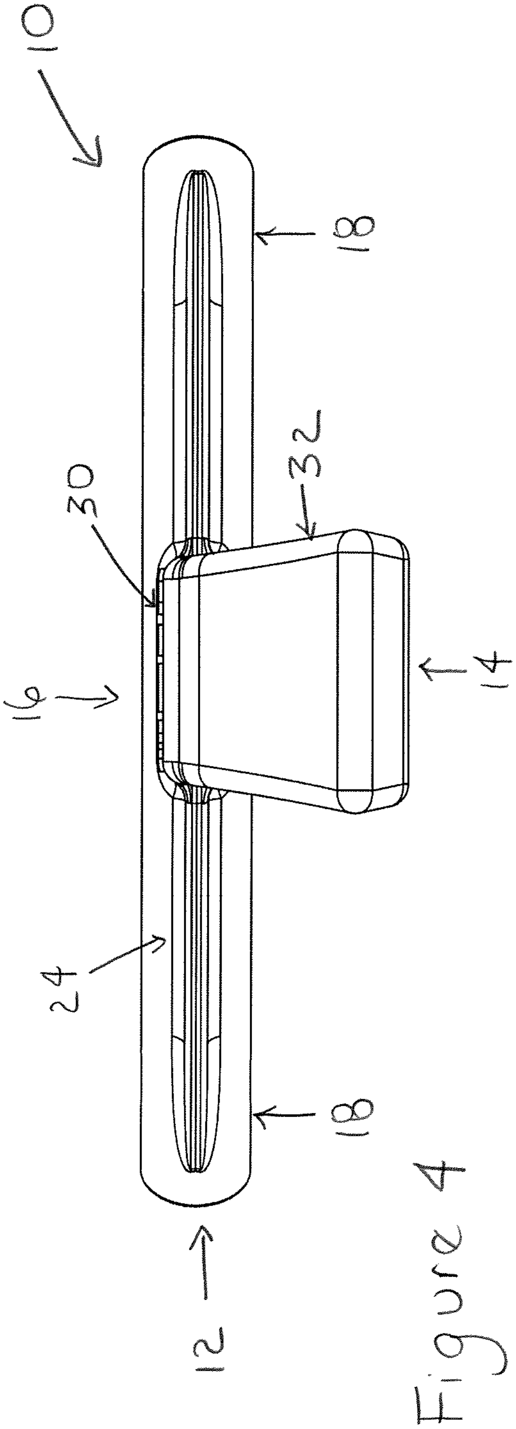
FIG. 4 is a rear elevational view of the disposal snap ring installation tool of FIG. 1.
Figure 6:
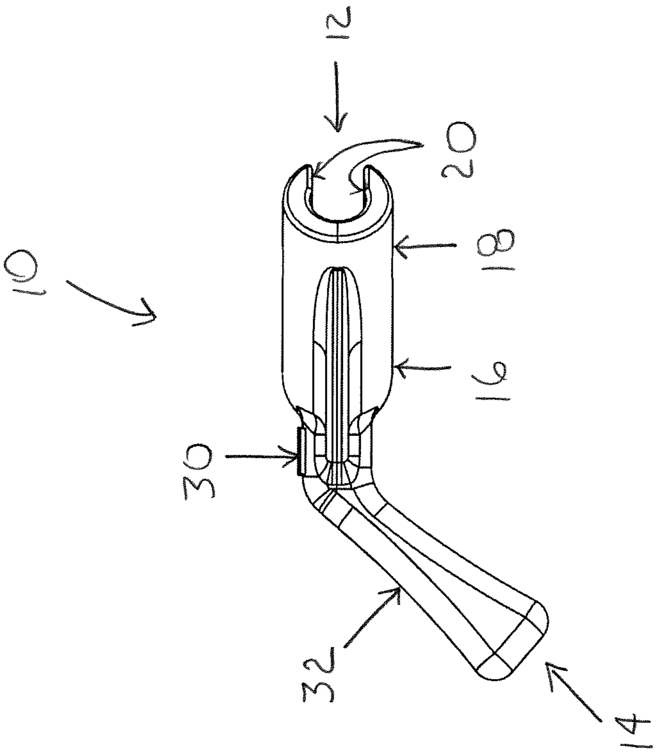
FIG. 6 is a left side elevational view of the disposal snap ring installation tool of FIG. 1.
Figure 5:
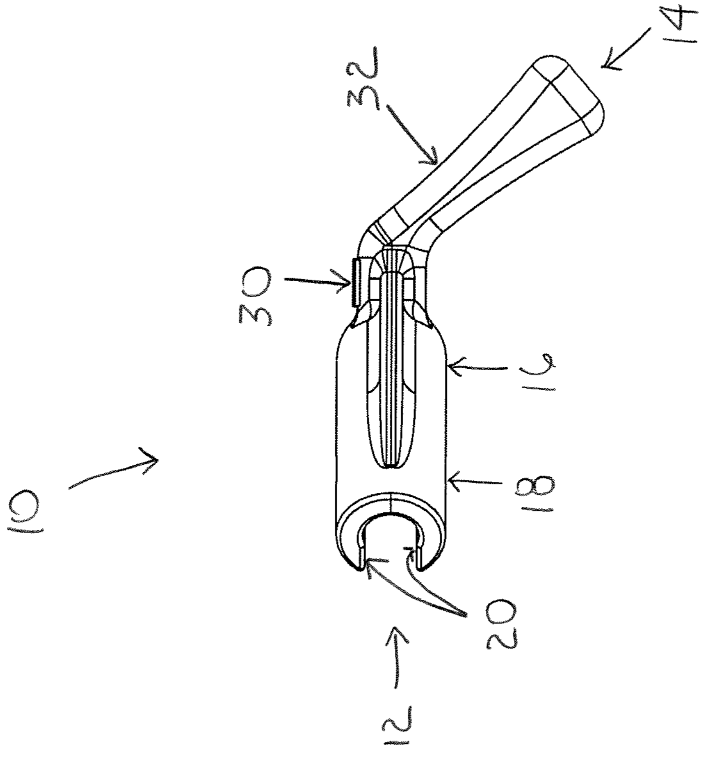
FIG. 5 is a right side elevational view of the disposal snap ring installation tool of FIG. 1.
Figure 7:
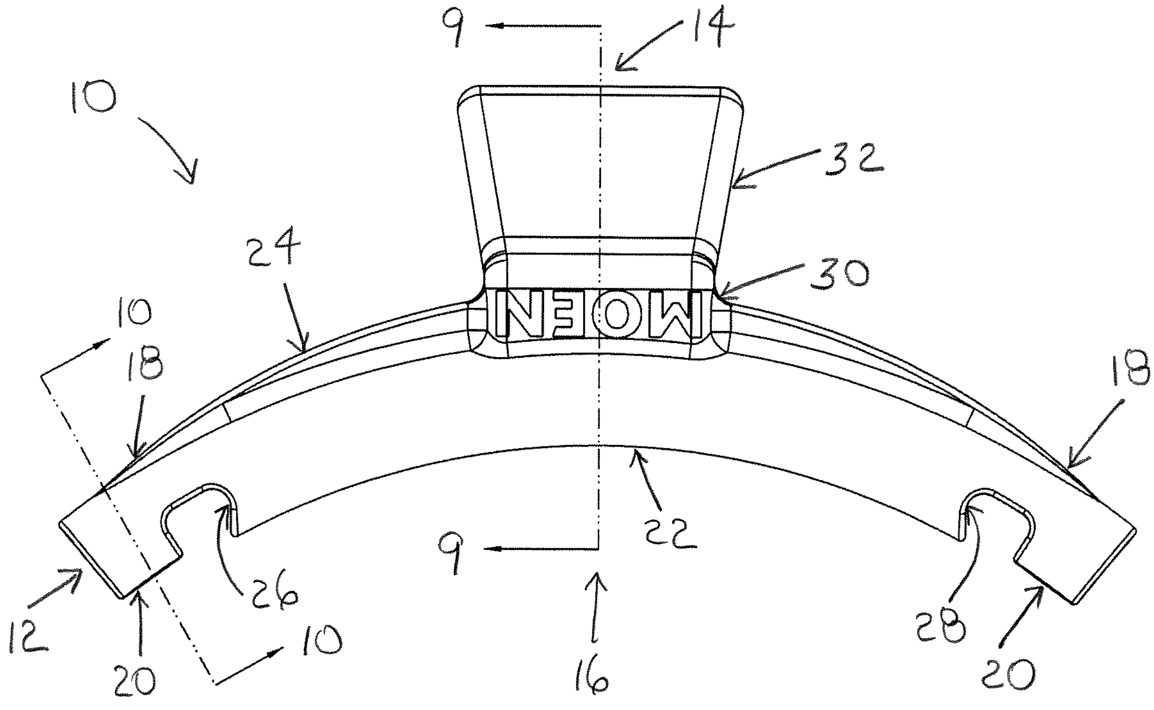
FIG. 7 is a top plan view of the disposal snap ring installation tool of FIG. 1.
Figure 8:
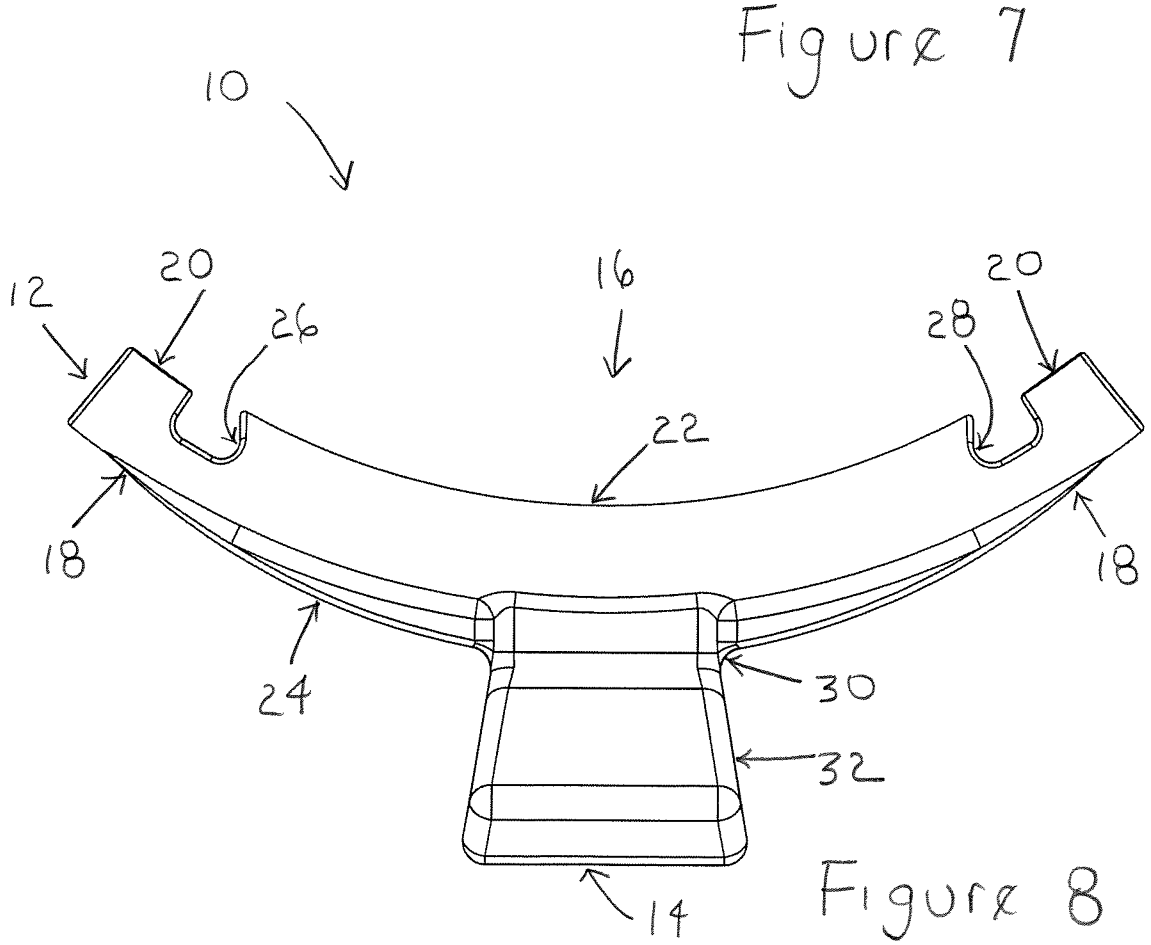
FIG. 8 is a bottom plan view of the disposal snap ring installation tool of FIG. 1.
Figure 10:
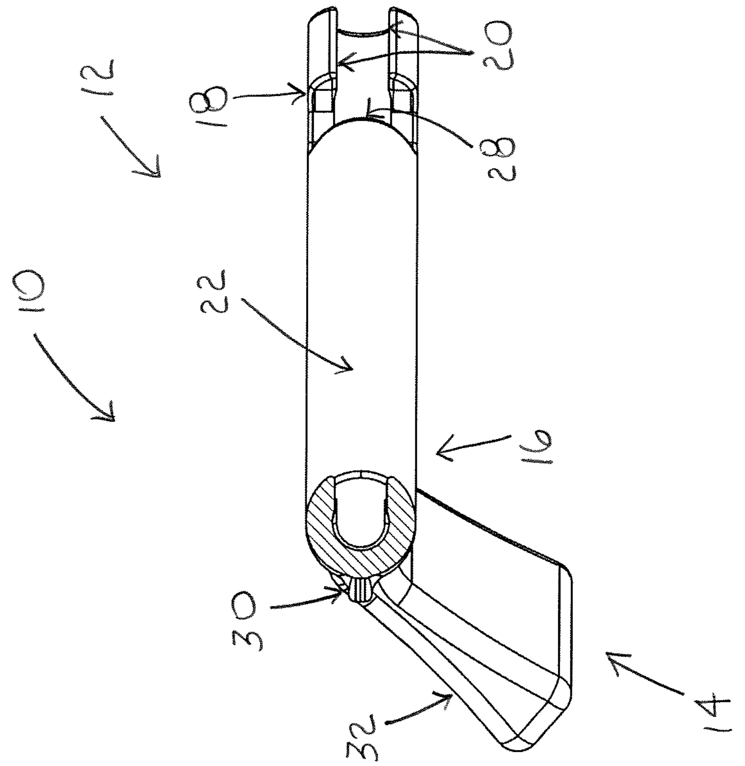
FIG. 10 is a cross-sectional view of the disposal snap ring installation tool of FIG. 1 taken along the line 10-10 in FIG. 7.
Figure 9:
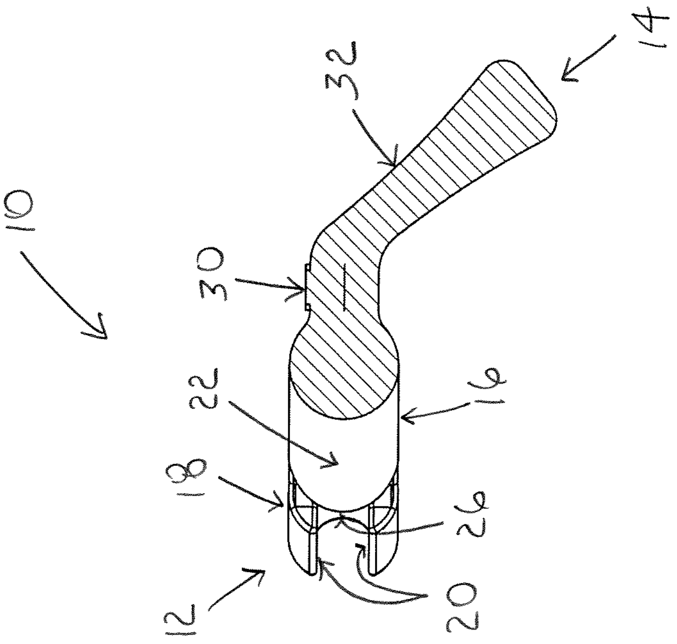
FIG. 9 is a cross-sectional view of the disposal snap ring installation tool of FIG. 1 taken along the line 9-9 in FIG. 7.

The present invention provides a disposal snap ring installation tool that enables a consumer to easily install a disposal snap ring.

An exemplary embodiment of a disposal snap ring installation tool 10 of the present invention is shown in detail in FIGS. 1-10. In an exemplary embodiment, the disposal snap ring installation tool 10 includes a body 12 and a handle 14.

In an exemplary embodiment, the body 12 includes a base 16, two arms 18, and four tabs 20. In an exemplary embodiment, the base 16 is generally arcuate shaped in a circumferential direction. In an exemplary embodiment, the base 16 includes an inner wall 22, an outer wall 24, a first end wall 26, and a second end wall 28. In an exemplary embodiment, the base 16 has a generally circular-shaped cross-section. In an exemplary embodiment, the base 16 is solid. In an exemplary embodiment, each arm 18 is generally arcuate shaped in a circumferential direction. In an exemplary embodiment, one arm 18 extends circumferentially outwardly from each of the first end wall 26 and the second end wall 28 of the base 16. In an exemplary embodiment, each arm 18 has a generally C-shaped cross-section. In an exemplary embodiment, each tab 20 is generally arcuate shaped in a radial direction. In an exemplary embodiment, at least one tab 20 extends radially inwardly from each arm 18. In an exemplary embodiment, at least one tab 20 extends radially inwardly from a top of one arm 18. In an exemplary embodiment, at least one tab 20 extends radially inwardly from a bottom of one arm 18. In an exemplary embodiment, each tab 20 extends along a portion of one arm 18 in the circumferential direction.

In an exemplary embodiment, the handle 14 includes a first portion 30 and a second portion 32. In an exemplary embodiment, the first portion 30 of the handle 14 extends radially outwardly from the outer wall 24 of the base 16. In an exemplary embodiment, the first portion 30 of the handle 14 extends solely radially outwardly from the outer wall 24 of the base 16. In an exemplary embodiment, at least a portion of the handle 14 extend radially outwardly from the outer wall 24 of the base 16. In an exemplary embodiment, the second portion 32 of the handle 14 extends angularly downwardly and outwardly from the first portion 30 of the handle 14. In an exemplary embodiment, the second portion 32 of the handle 14 extends solely angularly downwardly and outwardly from the first portion 30 of the handle 14. In an exemplary embodiment, at least a portion of the handle 14 extends radially downwardly and outwardly relative to the outer wall 24 of the base 16. In an exemplary embodiment, the handle 14 includes a portion that extends radially downwardly and outwardly from the outer wall 24 of the base 16.

In an exemplary embodiment, the disposal snap ring installation tool 10 is used to install a disposal snap ring 34. Exemplary steps for the installation of the disposal snap ring 34 are shown in FIGS. 11*a*-11*f*. The disposal snap ring 34 includes a ring 36 having a first end 38 and a second end 40 with a circumferential gap 42 therebetween (see FIG. 11*a*). The disposal snap ring 34 is installed in a sink flange 44 having a groove 46 therein (see FIG. 11*b*). The installation of the disposal snap ring 34 is one part of the installation of a disposal.

During installation of the disposal snap ring 34, the ring 36 is expanded until a circumferential length of the circumferential gap 38 is greater than a circumferential length of the body 12. The body 12 is inserted into the circumferential gap 38 in the ring 36 (see FIG. 11*c*). As the body 12 is inserted, each arm 18 receives one of the first end 38 and the second end 40 of the ring 36 such that the first end 38 and the second end 40 of the ring 36 abut the first end wall 26 and the second end wall 28 of the base 16, respectively. Further, the tabs 20 retain the first end 38 and the second end 40 of the ring 36 in the arms 18 of the body 12. In an exemplary embodiment, while the body 12 is inserted in the circumferential gap 38 in the ring 36, the ring 36 has a greater diameter than when the body 12 is not inserted in the circumferential gap 38.

After a mounting support ring 48 (also referred to as a backup flange) and a mounting support 50 (also referred to as a mounting ring) are slid onto the sink flange 44 (see FIG. 11*b*), the ring 36 is inserted into the groove 46 in the sink flange 44. First, a portion of the ring 36 opposite the circumferential gap 38 is inserted into the groove 46 in the sink flange 44 (see FIG. 11*d*). Second, the first end 38 and the second end 40 of the ring 36 with the body 12 inserted therebetween are inserted into the groove 46 in the sink flange 44 (see FIG. 11*e*).

Figure 11A:
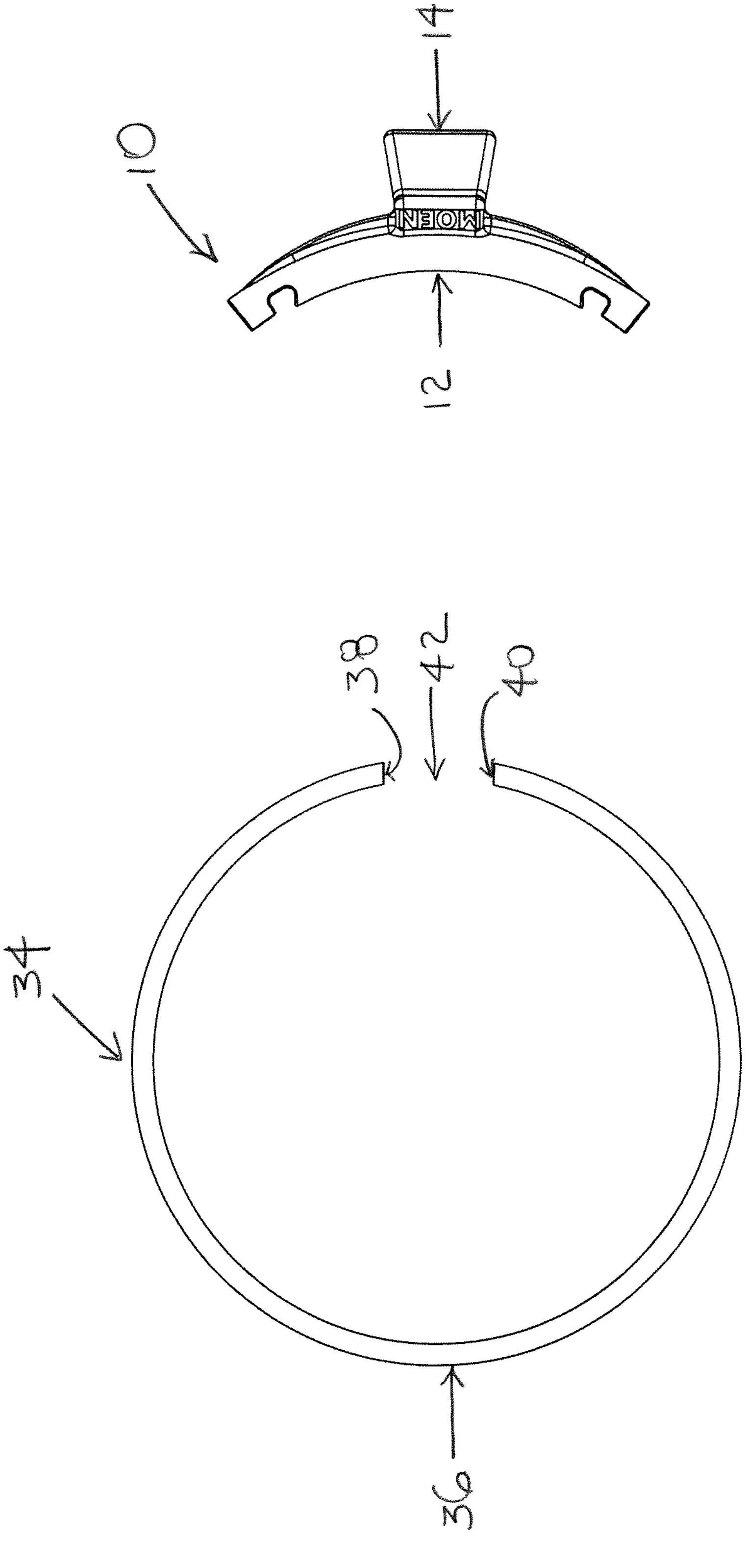
Figure 11B:
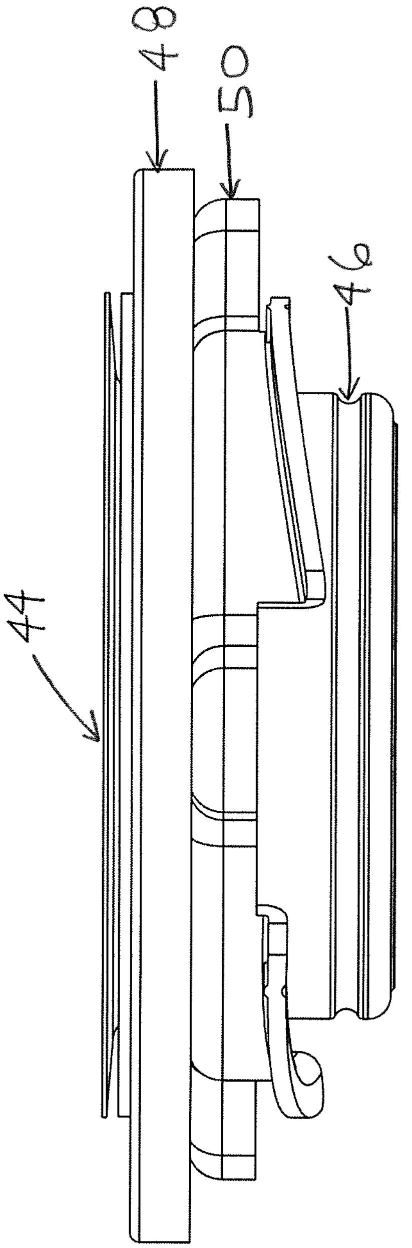
Figure 11C:
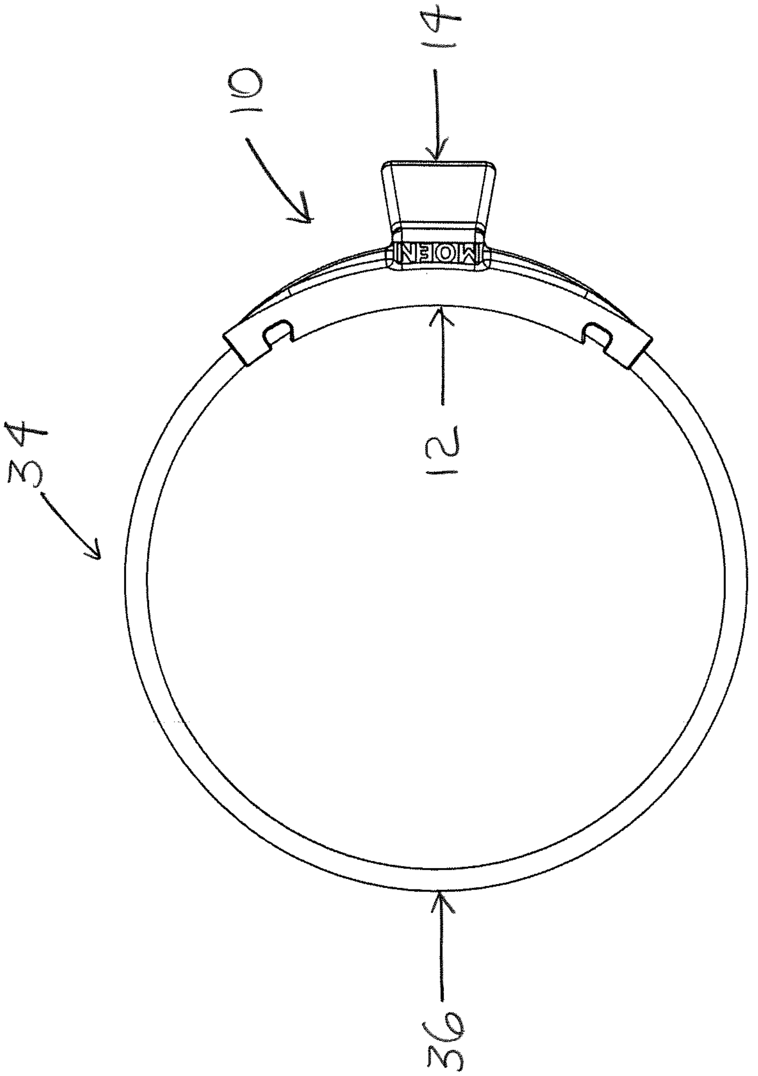
Figure 11D:
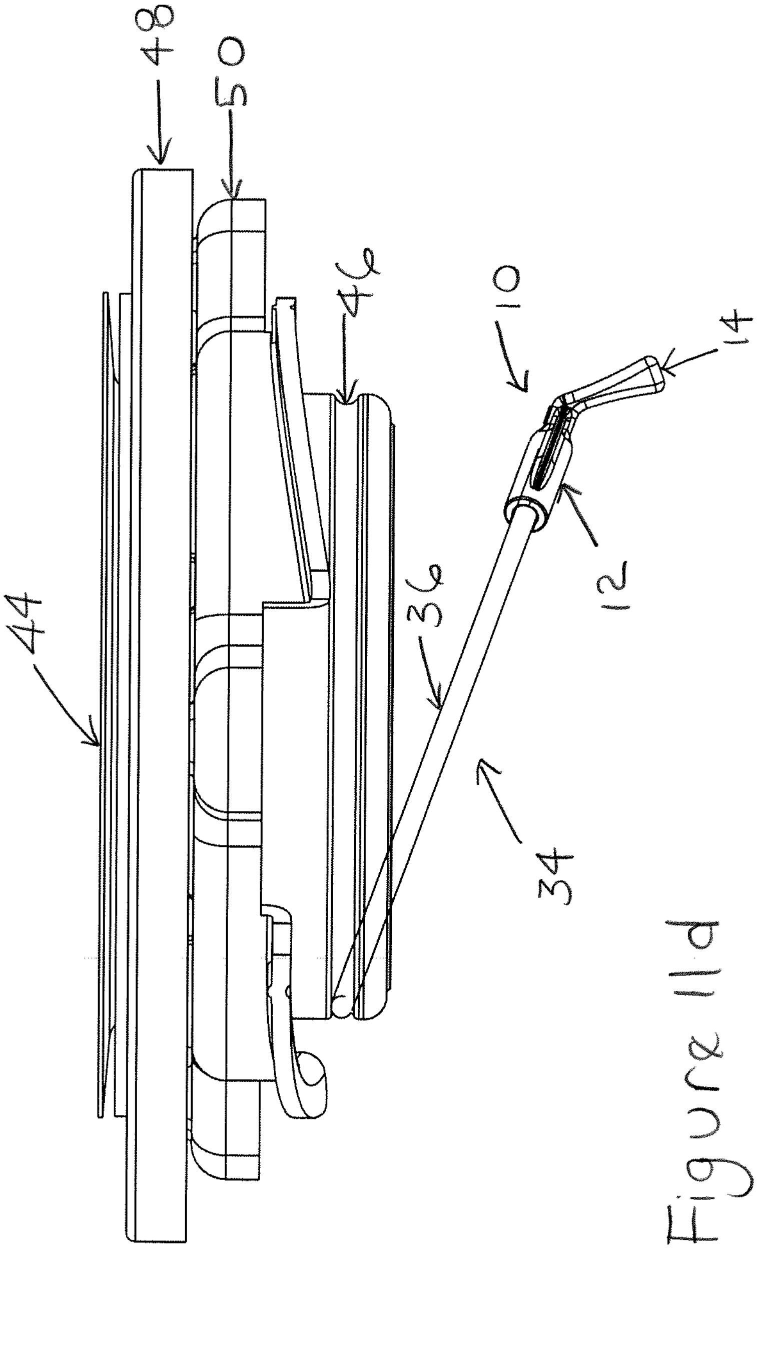
Figure 11A:
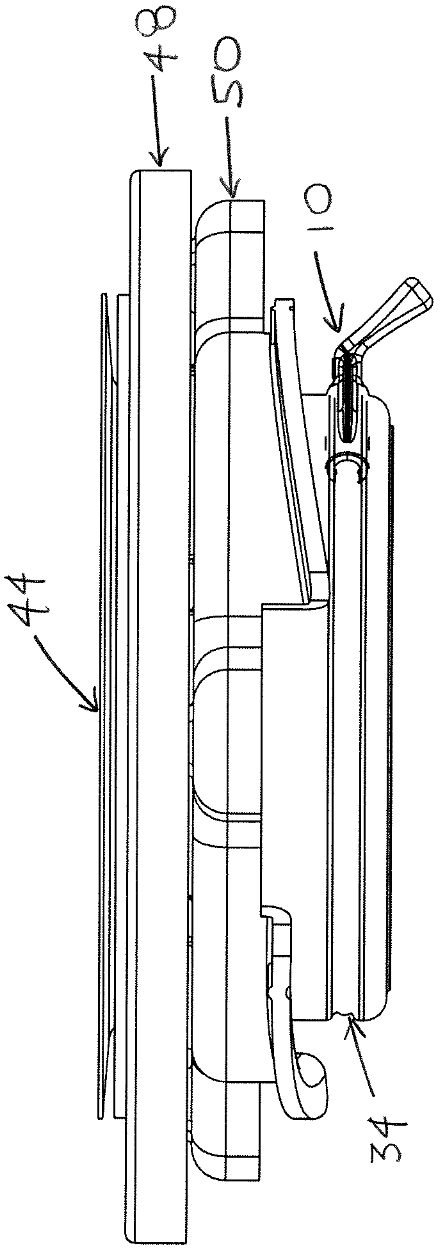
Figure 11F:
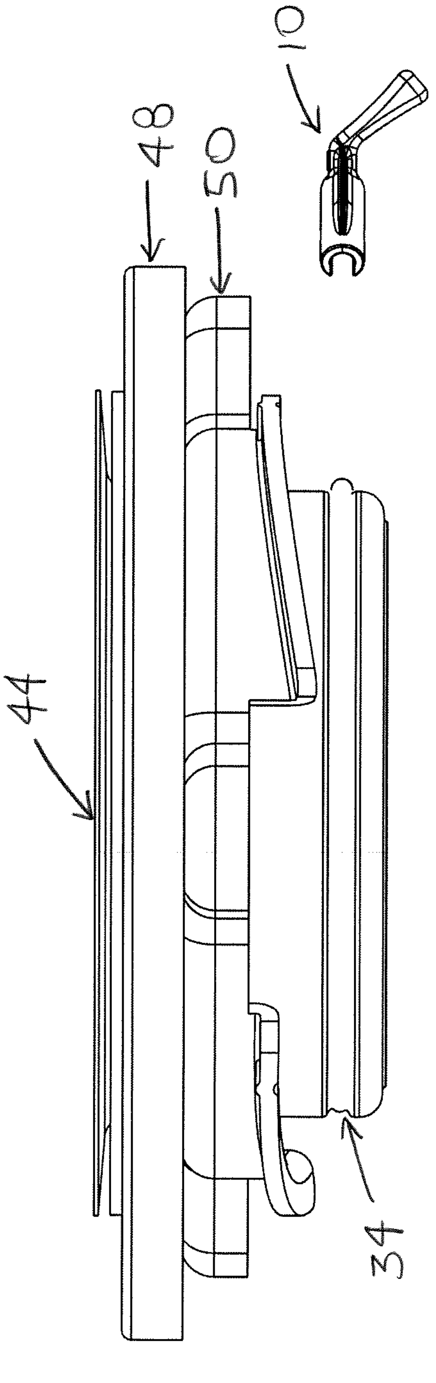

Finally, the body 12 is removed from the circumferential gap 38 in the ring 36 by pulling the handle 14 (see FIG. 11*f*). In an exemplary embodiment, the body 12 is removed by pulling the handle 14 radially outwardly in a plane of the disposal snap ring 34. In an exemplary embodiment, the body 12 is removed by pulling the handle 14 solely radially outwardly in the plane of the disposal snap ring 34. The disposal snap ring 34 is now installed.

While the disposal snap ring installation tool 10 has been shown and described in the illustrated embodiment as including certain components, one of ordinary skill in the art will appreciate that the disposal snap ring installation tool 10 does not need to include each of these components and/or the specifics of each of these components.

For example, while the disposal snap ring installation tool 10 has been shown and described with the handle 14 including the first portion 30 and the second portion 32, one of ordinary skill in the art will appreciate that the handle 14 could include one portion or more than two portions.

Similarly, while the disposal snap ring installation tool 10 has been shown and described as including two arms 18, one of ordinary skill in the art will appreciate that the disposal snap ring installation tool 10 could include one arm or more than two arms.

Further, while the disposal snap ring installation tool 10 has been shown and described as including four tabs 20 on the arms 18, one of ordinary skill in the art will appreciate that the disposal snap ring installation tool 10 may not include any tabs or could include any number of tabs. In an embodiment where the disposal snap ring installation tool 10 does not include any tabs on the arms 18, the arms 18 are operable to retain the first end 38 and the second end 40 of the ring 36 therein.

One of ordinary skill in the art will now appreciate that the present invention provides a disposal snap ring installation tool that enables a consumer to easily install a disposal snap ring. Although the present invention has been shown and described with reference to a particular embodiment, equivalent alterations and modifications will occur to those skilled in the art upon reading and understanding this specification. The present invention includes all such equivalent alterations and modifications.

What is claimed is:

1. A disposal snap ring installation tool, comprising:
   - a body, the body including:
     - a base, the base being generally arcuate shaped in a circumferential direction, the base including an inner wall, an outer wall, a first end wall, and a second end wall; and
     - two arms, each arm being generally arcuate shaped in a circumferential direction, each arm extending circumferentially outwardly from one of the first end wall and the second end wall of the base; and
   - a handle, at least a portion of the handle extending angularly downwardly and outwardly relative to the outer wall of the base;
   - wherein the base is operable to be inserted into a circumferential gap in a disposal snap ring;
   - wherein each arm is operable to receive an end of the disposal snap ring such that each end of the disposal snap ring abuts one of the first end wall and the second end wall of the base; and wherein the base is operable to be removed from the circumferential gap in the disposal snap ring by pulling the handle radially outwardly in a plane of the disposal snap ring.

2. The disposal snap ring installation tool of claim 1, wherein the base has a generally circular-shaped cross-section.

3. The disposal snap ring installation tool of claim 1, wherein the base is solid.

4. The disposal snap ring installation tool of claim 1, wherein the arm has a generally C-shaped cross-section.

5. The disposal snap ring installation tool of claim 1, wherein:

the handle includes a first portion and a second portion;

the first portion extends radially outwardly from the outer wall of the base, and the second portion extends angularly downwardly and outwardly from the first portion.

6. The disposal snap ring installation tool of claim 5, wherein the first portion of the handle extends solely radially outwardly from the outer wall of the base.

7. The disposal snap ring installation tool of claim 5, wherein the second portion of the handle extends solely angularly downwardly and outwardly from the first portion.

8. The disposal snap ring installation tool of claim 5, wherein the base is operable to be removed from the circumferential gap in the disposal snap ring by pulling the handle solely radially outwardly in the plane of the disposal snap ring.

9. A disposal snap ring installation tool, comprising:

a body, the body including:

a base, the base being generally arcuate shaped in a circumferential direction, the base including an inner wall, an outer wall, a first end wall, and a second end wall; and two arms, each arm being generally arcuate shaped in a circumferential direction, one arm extending circumferentially outwardly from each of the first end wall and the second end wall of the base; and a handle, the handle including:

a first portion, the first portion extending radially outwardly from the outer wall of the base, and a second portion, the second portion extending angularly downwardly and outwardly from the first portion;

wherein the base is operable to be inserted into a circumferential gap in a disposal snap ring;

wherein each arm is operable to receive an end of the disposal snap ring such that each end of the disposal snap ring abuts one of the first end wall and the second end wall of the base; and wherein the base is operable to be removed from the circumferential gap in the disposal snap ring by pulling the handle radially outwardly in a plane of the disposal snap ring.

10. The disposal snap ring installation tool of claim 9, wherein the base has a generally circular-shaped cross-section.

11. The disposal snap ring installation tool of claim 9, wherein the base is solid.

12. The disposal snap ring installation tool of claim 9, wherein the arm has a generally C-shaped cross-section.

13. The disposal snap ring installation tool of claim 9, wherein the first portion of the handle extends solely radially outwardly from the outer wall of the base.

14. The disposal snap ring installation tool of claim 9, wherein the second portion of the handle extends solely angularly downwardly and outwardly from the first portion.

15. The disposal snap ring installation tool of claim 9, wherein the base is operable to be removed from the circumferential gap in the disposal snap ring by pulling the handle solely radially outwardly in the plane of the disposal snap ring.

16. A disposal snap ring installation tool, comprising:

a body, the body including:

a base, the base being generally arcuate shaped in a circumferential direction, the base including an inner wall, an outer wall, a first end wall, and a second end wall;

two arms, each arm being generally arcuate shaped in a circumferential direction, one arm extending circumferentially outwardly from each of the first end wall and the second end wall of the base; and a plurality of tabs, each tab being generally arcuate shaped in a radial direction, at least one tab extending radially inwardly from each arm; and a handle, at least a portion of the handle extending angularly downwardly and outwardly relative to the outer wall of the base;

wherein the base is operable to be inserted into a circumferential gap in a disposal snap ring;

wherein each arm is operable to receive an end of the disposal snap ring such that each end of the disposal snap ring abuts one of the first end wall and the second end wall of the base;

wherein the tabs are operable to retain the ends of the disposal snap ring in the arms of the body; and wherein the base is operable to be removed from the circumferential gap in the disposal snap ring by pulling the handle radially outwardly in a plane of the disposal snap ring.

17. The disposal snap ring installation tool of claim 16, wherein each tab extends along a portion of one arm in the circumferential direction.

18. The disposal snap ring installation tool of claim 16, wherein at least one tab extends radially inwardly from a top of one arm.

19. The disposal snap ring installation tool of claim 16, wherein at least one tab extends radially inwardly from a bottom of one arm.

* * * * *